United States Patent
Lindgren

(10) Patent No.: US 10,706,589 B2
(45) Date of Patent: Jul. 7, 2020

(54) VISION SYSTEM FOR A MOTOR VEHICLE AND METHOD OF CONTROLLING A VISION SYSTEM

(71) Applicant: VEONEER SWEDEN AB, Vargarda (SE)

(72) Inventor: Leif Lindgren, Linkoping (SE)

(73) Assignee: VEONEER SWEDEN AB, Vargarda (SE)

( * ) Notice: Subject to any disclaimer, the term of this patent is extended or adjusted under 35 U.S.C. 154(b) by 78 days.

(21) Appl. No.: 15/780,556

(22) PCT Filed: Dec. 2, 2016

(86) PCT No.: PCT/EP2016/079644
§ 371 (c)(1),
(2) Date: May 31, 2018

(87) PCT Pub. No.: WO2017/093518
PCT Pub. Date: Jun. 8, 2017

(65) Prior Publication Data
US 2018/0357792 A1    Dec. 13, 2018

(30) Foreign Application Priority Data
Dec. 4, 2015   (EP) ..................... 15198019

(51) Int. Cl.
*G06T 7/80* (2017.01)
*G06K 9/00* (2006.01)
(Continued)

(52) U.S. Cl.
CPC ............ *G06T 7/85* (2017.01); *G06K 9/00791* (2013.01); *G06T 7/231* (2017.01);
(Continued)

(58) Field of Classification Search
None
See application file for complete search history.

(56) References Cited

U.S. PATENT DOCUMENTS

| | | | |
|---|---|---|---|
| 5,986,601 A | 11/1999 | Sugimoto | |
| 6,202,027 B1 | 3/2001 | Alland et al. | |

(Continued)

FOREIGN PATENT DOCUMENTS

| | | |
|---|---|---|
| DE | 197 51 004 A1 | 5/1999 |
| DE | 10 2008 008 619 A1 | 7/2008 |

(Continued)

OTHER PUBLICATIONS

Atanassov, Kalin, et al. "Unassisted 3D camera calibration." Stereoscopic Displays and Applications XXIII. vol. 8288. International Society for Optics and Photonics, 2012. (Year: 2012).*

(Continued)

*Primary Examiner* — Vu Le
*Assistant Examiner* — Tracy Mangialaschi
(74) *Attorney, Agent, or Firm* — Dickinson Wright PLLC

(57) ABSTRACT

A motor vehicle vision system (10) includes a pair of imaging devices (12a, 12b) forming a stereo imaging apparatus (11) and a data processing apparatus (14) for rectification of images captured by the stereo imaging apparatus (11), matching of rectified images, and to detect an object in the surrounding of the motor vehicle. The data processing device (14) performs, for image elements (43) of a rectified image from one imaging device, a search for a best-matching image element (44') in the corresponding rectified image from the other imaging device. The search yielding vertical shift information from which a vertical shift from the image element (43) to the best-matching image element (44') is derivable. The data processing device (14) calculates a pitch angle error and/or a roll angle error of or between the (Continued)

imaging devices (12a, 12b) from the vertical shift information.

12 Claims, 3 Drawing Sheets

(51) Int. Cl.
  *G06T 7/231* (2017.01)
  *H04N 13/239* (2018.01)
(52) U.S. Cl.
  CPC ............ *G06T 2207/10012* (2013.01); *G06T 2207/30252* (2013.01); *H04N 13/239* (2018.05)

(56) References Cited

U.S. PATENT DOCUMENTS

| | | | |
|---|---|---|---|
| 6,356,229 | B1 | 3/2002 | Schneider |
| 7,443,335 | B2 | 10/2008 | Kai et al. |
| 8,866,889 | B2 | 10/2014 | Masalkar et al. |
| 9,066,085 | B2 | 6/2015 | Cluff et al. |
| 9,161,015 | B2 | 10/2015 | Myokan et al. |
| 9,187,051 | B2 | 11/2015 | Feser et al. |
| 9,384,551 | B2 | 7/2016 | Ramaswamy et al. |
| 2002/0044082 | A1 | 4/2002 | Woodington et al. |
| 2008/0002878 | A1* | 1/2008 | Meiyappan ............ G06K 9/32 382/154 |
| 2012/0105585 | A1 | 5/2012 | Masalkar et al. |
| 2012/0194652 | A1 | 8/2012 | Myokan et al. |
| 2013/0016186 | A1 | 1/2013 | Atanassov et al. |
| 2013/0147948 | A1 | 6/2013 | Higuchi et al. |
| 2014/0168377 | A1 | 6/2014 | Cluff et al. |
| 2014/0300704 | A1 | 10/2014 | Ramaswamy et al. |
| 2014/0330485 | A1 | 11/2014 | Feser et al. |
| 2015/0210274 | A1 | 7/2015 | Clarke et al. |

FOREIGN PATENT DOCUMENTS

| | | | | |
|---|---|---|---|---|
| DE | 102008008619 | A1 * | 7/2008 | ............ G03B 35/08 |
| DE | 10 2012 009 577 | A1 | 11/2012 | |
| EP | 2 579 231 | A1 | 4/2013 | |
| EP | 2 624 575 | A1 | 8/2013 | |
| JP | 2012-075060 | A | 4/2012 | |
| JP | 2014-038401 | A | 2/2014 | |
| JP | 2014-521262 | A | 8/2014 | |
| JP | 2015-505759 | A | 2/2015 | |
| WO | WO 2008/002271 | A1 | 1/2008 | |
| WO | WO 2008/075271 | A2 | 6/2008 | |

OTHER PUBLICATIONS

Zilly, Frederik, et al. "Joint estimation of epipolar geometry and rectification parameters using point correspondences for stereoscopic TV sequences." Proceedings of 3DPVT. vol. 2. 2010. (Year: 2010).*
Greisen, Pierre, et al. "An FPGA-based processing pipeline for high-definition stereo video." EURASIP Journal on Image and Video Processing 2011.1 (2011): 18. (Year: 2011).*
International Search Report and Written Opinion of PCT/EP2016079644 dated Mar. 27, 2017.
European Search Report and Opinion of EP 3 176 750 (A1) dated Sep. 8, 2016.
Zilly, Frederick, et al., "Joint Estimation of Epipolar Geometry and Rectification Parameters Using Point Correspondence for Stereoscopic TV Sequences", Fifth International Symposium on 3D Data Processing, Visualization and Transmission. Electronic Proceedings: May 17-20 (May 17, 2010), abstract and pp. 1-7.
Spangenberg, Robert, et al. "Large Scale Semi-Global Matching on the CPU", 2014 IEEE Intelligent Vehicles Symposium (IV) Jun. 8-11, 2014, (Jun. 8-11, 2014) Dearborn, Michigan, USA, pp. 195-201.
Valgaerts, Levi, et al. "Dense Versus Sparse Approaches for Estimating the Fundamental Matrix", International Journal Computer Vision, vol. 96, No. 2, Jun. 1, 2011, pp. 212-234.
Atanassov, Kalin, et al. "Unassisted 3D Camera Calibration", Proceedings of SPIE, vol. 8288, Stereoscopic Displays and Applications XXIII, 828808 (Feb. 23, 2012); DOI: 10.1117/12.909616, pp. 828808-1-828808-9.
Chen, Mei-Juan, et al. "One-Dimensional Full Search Motion Estimation Algorithm for Video Coding", IEEE Transactions on Circuits and Systems for Video Technology, vol. 4, No. 5, Oct. 1, 1994, pp. 504-509.

* cited by examiner

VISION SYSTEM FOR A MOTOR VEHICLE AND METHOD OF CONTROLLING A VISION SYSTEM

CROSS-REFERENCE TO RELATED APPLICATIONS

This application is a 35 U.S.C. § 371 national phase application of PCT International Application No. PCT/EP2016/079644, filed Dec. 2, 2017, which claims the benefit of priority under 35 U.S.C. § 119 to EP 15198019.0, filed Dec. 4, 2015, the contents of which are incorporated herein by reference in their entirety.

FIELD OF THE INVENTION

The invention relates to a vision system for a motor vehicle, including a pair of imaging devices forming a stereo imaging apparatus and a data processing apparatus adapted to perform rectification of images captured by the stereo imaging apparatus, stereo matching of rectified images, and to detect an object in the surrounding of the motor vehicle from stereo matched images. The invention also relates to a method of controlling a vision system.

BACKGROUND

For an accurate calculation of a disparity image or depth image from a stereo camera, the orientation of the two cameras relative to each other must be known. Errors in pitch angle between the two cameras causes one camera to look more downward compared to the other. A roll angle means a rotation of an image plane around the corresponding optical axis. Both these angles must be known in order perform accurate stereo matching between left and right images. For an automotive stereo camera, these angles will not be constant over the vehicle life time due to thermal changes and the long life time of automotive systems. Therefore, an online solution for estimating the pitch and roll angle errors is needed.

A conventional method for estimating pitch and roll angles which is known as 5-point method or feature point method involves finding, for example, five distinctive points, called feature points, in a left and right image pair, and estimating the pitch and roll angle errors from these feature points. This method, however, requires the finding of feature points in the images, and will not work well for example in monotonous, low-light or rainy environments where distinctive feature points cannot be found.

SUMMARY

A feature of the present invention is to provide a vision system and method which allow for an accurate determination of a pitch angle error and/or a roll angle error between the stereo cameras during operation of a motor vehicle.

The invention addresses the above-mentioned object with the features are described herein. According to an example embodiment of the invention, for image elements of a rectified image from one imaging device, a search for a best-matching image element in a two-dimensional search area of the corresponding rectified image from the other imaging device is performed. The search yields vertical shift information from which a vertical shift from the image element to the best-matching image element is derivable. The invention has realized that a pitch angle error and/or a roll angle error of or between the imaging devices can be easily calculated on the basis of, i.e. directly or indirectly from, such vertical shift information. According to the invention, there is no need to find any distinctive feature points in the images, and the determination of the pitch and roll angle errors is possible under all conditions in the inspected car environment. Since the calculations are performed on rectified images, it is the error of the pitch and/or roll angles used in the stereo matching or rectification which is calculated.

An image element according to the invention can be a pixel, i.e. the smallest possible image element or picture element, or an image area composed of a plurality of pixels, for example a rectangular area of p×q pixels, where p and q are integers larger than one.

In one embodiment of the present invention, which in particular relates to the use of a one-dimensional horizontal search engine, the vertical shift information includes a plurality of match related scores indicating the degree of vertical match between the image element under consideration and a plurality of image elements of the corresponding rectified image from the other imaging device shifted with different vertical components relative to the image element under consideration, yielding a vertical matching cost cube. Specifically, when a one-dimensional horizontal search engine is used, each one-dimensional horizontal search calculates a horizontal match or cost tuple, with one match or cost value for each horizontal position in the one-dimensional horizontal search. The lowest match or cost value in each horizontal match or cost tuple is extracted, yielding the vertical matching cost cube containing one match or cost value for each horizontal search performed. Such a vertical match score cube contains all information of an image required to calculate the pitch angle error and/or roll angle error affecting the stereo matching.

Preferably, pluralities of image elements are bundled into larger image regions and for each vertical shift the cost values, or match related scores, from each image element in that image region are summed up or accumulated, yielding a reduced size matching cost cube. This approach has the advantage of much lower data amounts as compared to the large vertical matching cost cube, while still enabling a high and sufficient precision regarding the calculation of the pitch angle error and the roll angle error. In other words, match scores or cost values from many pixels can be combined into image regions to save memory bandwidth, memory size, and processing requirements.

Preferably, the vertical shift giving the best match for each image region is determined from the reduced cost cube, yielding a vertical shift map. From such shift map the pitch and/or roll angel errors can be most easily calculated. For example, a pitch error can be estimated from a contribution to the shift map pointing in the same direction and having the same size; a roll error can be estimated from a contribution to the shift map pointing in opposite directions on the right and on the left, and increasing from the center to the left and to the right. Alternatively, a pitch error and a roll error can be computed from the shift map simultaneously using a minimization function, in particular a least square minimization function. It is also possible to calculate the pitch and/or roll angel errors directly from the vertical match score cube or from the reduced cost cube, without the use of a shift map.

In some embodiments of the present invention, in addition to calculating the pitch and/or roll angle errors, an error in the focal length difference between both imaging devices can be calculated from the vertical shift information. For example, a focal length difference can be estimated from a contribution to the shift map pointing in opposite directions on the top and on the bottom, and increasing from the center to the top and to the bottom. Alternatively, a focal length difference error can be computed from the shift map simultaneously with the pitch error and/or roll error using a minimization function. It is also possible to calculate the focal length difference error directly from the vertical match score cube or from the reduced cost cube, without the use of a shift map.

In a preferred embodiment, the search is performed using a one-dimensional horizontal search engine and performing a plurality of one-dimensional horizontal searches shifted by different amounts relative to each other in the vertical direction. In other words, an existing one-dimensional stereo matching hardware or software engine can simply be re-used, e.g. by time sharing it with the standard stereo calculations done in the vision system. For example, the search can be performed in idle time slots of, and/or in alternating time slots with, the horizontal stereo matching process.

In another embodiment of the present invention, a fully two-dimensional search engine can be used for performing the horizontal stereo matching process and the search simultaneously. Particularly suited are two-dimensional search engines used in optical flow calculations, since the mathematical problem underlying both tasks is essentially the same. Such a two-dimensional search engine yields vertical shift information in the form of a vector from each image element under consideration to the best matching image element in the corresponding image from the other imaging device. A vertical shift map can easily be derived from these vectors by simply taking the vertical components of the vectors.

A search engine may be a software engine or a dedicated search hardware. In particular, a one-dimensional search engine may be formed by a horizontal stereo matching hardware block.

Preferably the calculated pitch angle error and/or roll angle error is used in later stereo matching processes. In other words, any mismatch of the imaging devices due to a pitch angle error and/or a roll angle error can be compensated for automatically and continuously during driving.

To have a stable and accurate result, the estimated pitch and/or roll angles from each image pair can be filtered using suited signal processing algorithms. It is also possible to combine several shift maps before estimating the pitch and/or roll angles, in order to improve the statistics and thereby the accuracy. For the same reason, it is possible to combine several matching score cubes, or cost cubes, before performing further processing based on the matching score cubes, or cost cubes, in particular before calculation of a shift map.

In the following the invention shall be illustrated on the basis of preferred embodiments with reference to the accompanying drawings, wherein.

DETAILED DESCRIPTION

Figure 1:
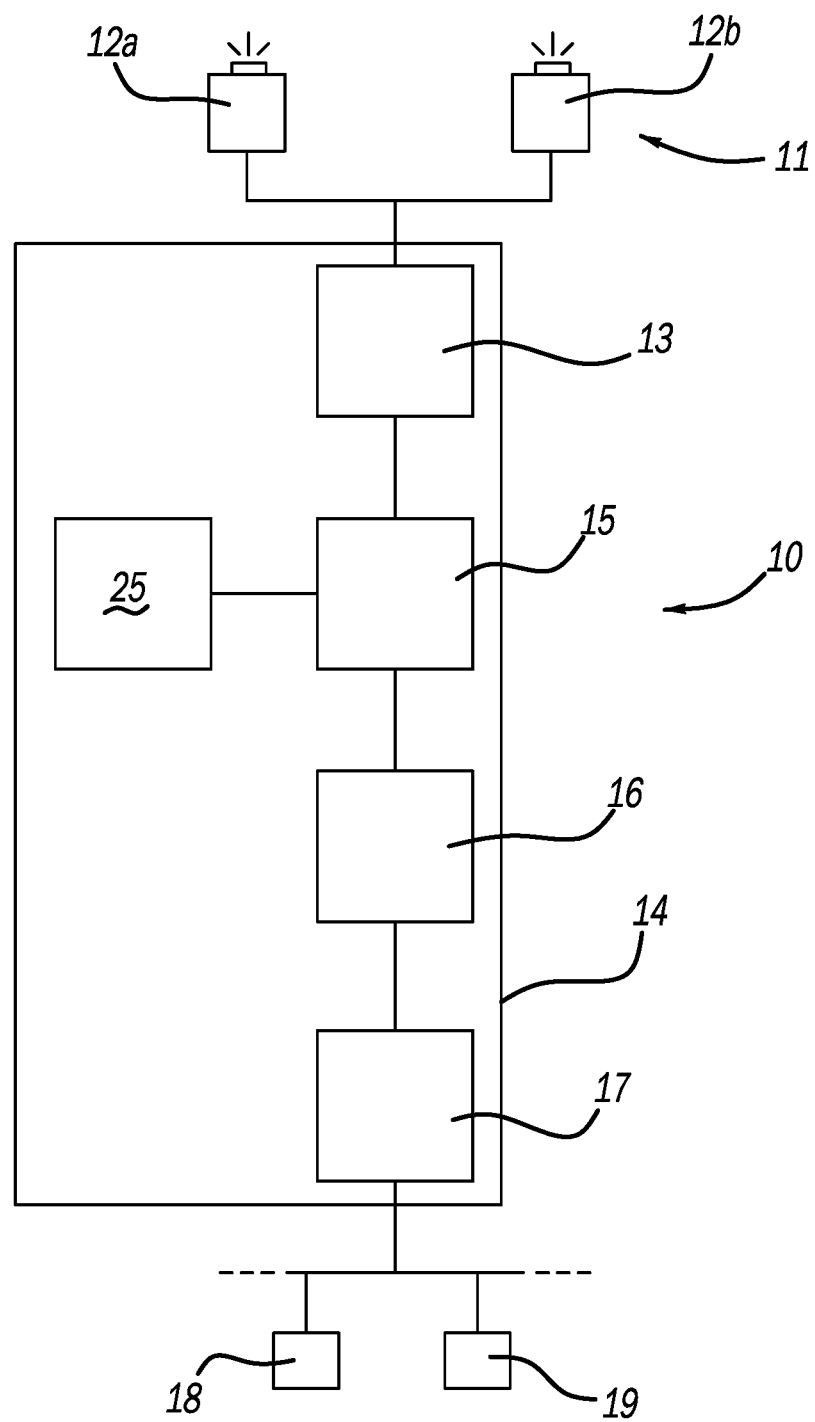
FIG. 1 shows a schematic drawing of a stereo vision system in a motor vehicle.

The vision system 10 is mounted in a motor vehicle and includes an imaging apparatus 11 for acquiring images of a region surrounding the motor vehicle, for example a region in front of the motor vehicle. The imaging apparatus 11 includes two optical imaging devices 12a, 12b, in particular cameras, forming a stereo imaging apparatus 11 and operating in the visible and/or infrared wavelength range, where infrared covers near IR with wavelengths below 5 microns and/or far IR with wavelengths beyond 5 microns.

The imaging apparatus 11 is coupled to a data processing device 14 adapted to process the image data received from the imaging apparatus 11. The data processing device 14 advantageously includes a pre-processing section 13 adapted to control the capture of images by the imaging apparatus 11, receive the electrical signal containing the image information from the imaging apparatus 11, rectify or warp pairs of left/right images into alignment and/or create disparity images, which per se is known in the art. The image pre-processing section 13 may be realized by a dedicated hardware circuit, for example a Field Programmable Gate Array (FPGA). Alternatively the pre-processing section 13, or part of its functions, can be realized in a microprocessor or a System-On-Chip (SoC) device including, for example, FPGA, DSP, ARM and/or microprocessor functionalities.

Further image and data processing is carried out in the data processing device 14 by corresponding software. In particular, the data processing device 14 includes an object detection section 15 adapted to identify and preferably also classify possible objects in front of the motor vehicle, such as pedestrians, other vehicles, bicyclists and/or large animals, a tracking section 16 adapted to track over time the position of object candidates in the recorded images identified by the object detection section 15, and an estimation and decision section 17 adapted to estimate a collision probability of a tracked object and to activate or control at least one driver assistance device 18, 19 depending on the estimated collision probability. The driver assistance device 18 may in particular include a display device 18 for displaying information relating to a detected object. However, the invention is not limited to a display device 18. The driver assistance device 18, 19 may in addition or alternatively include a warning system adapted to provide a collision warning to the driver by suitable optical, acoustical and/or haptic warning signals; one or more restraint systems such as occupant airbags or safety belt tensioners, pedestrian airbags, hood lifters and the like; and/or dynamic vehicle control systems such as brakes or steering means. The data processing device 14 preferably includes a memory device 25.

The data processing device 14 is preferably a digital device which is programmed or programmable and expediently includes a microprocessor, micro-controller, a digital signal processor (DSP) or a System-On-Chip (SoC) device including, for example, FPGA and microprocessor functionality. The data processing device 14 including the pre-processing section 13 and the memory device 25 is preferably realised in an on-board electronic control unit (ECU), and may be connected to the imaging apparatus 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image pre-processing, image processing to possible activation or control of driver assistance device 18, and/or regression analysis are performed automatically and continuously during driving in real time.

In the following, the inventive calculation of a pitch and/or roll angle error between the imaging devices 12a, 12b during driving is explained by way of example. The following procedure takes place in the data processing apparatus 14, preferably in the pre-processing section 13 thereof.

Figure 2:
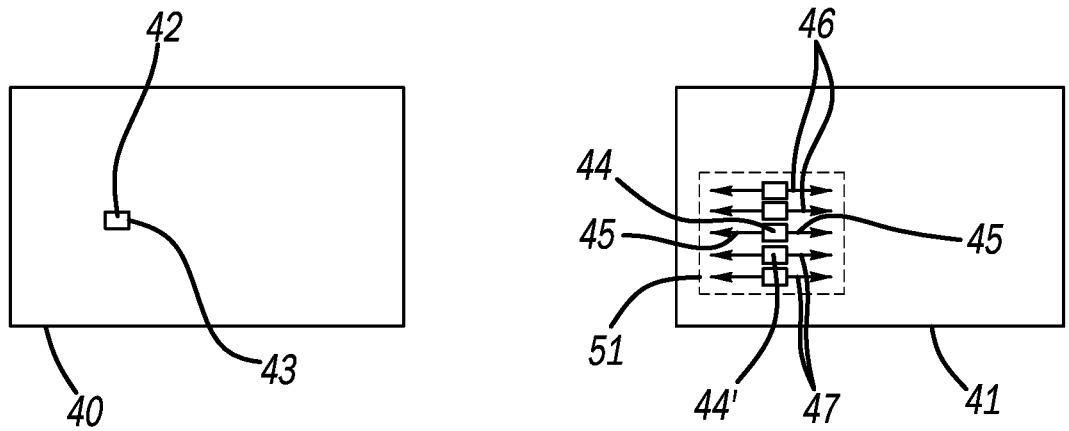
FIG. 2 illustrates horizontal stereo matching and vertical matching for a left/right image pair.

FIG. 2 shows an image 40 taken with the left camera 12a and an image 41 taken with the right camera 12b. First of all, as mentioned above, a rectification step is provided where the left/rights images are rectified, or warped, relative to each other in order to bring them into alignment.

After the rectification step, a horizontal stereo matching step is performed on the rectified left/right images. This step includes finding the best horizontal match for each pixel of the left/right images, and calculating a disparity value for each pixel, resulting in a disparity image including depth information. Specifically, in the step of finding the best horizontal match for each pixel of the left/right images, typically for each pixel 42 in one image a small image part 43 around this pixel is taken and a one-dimensional horizontal search 45 is made for the corresponding small image part 44 in the other image using a cost function, for example the sum of absolute differences or the sum of squared differences.

Figure 3:
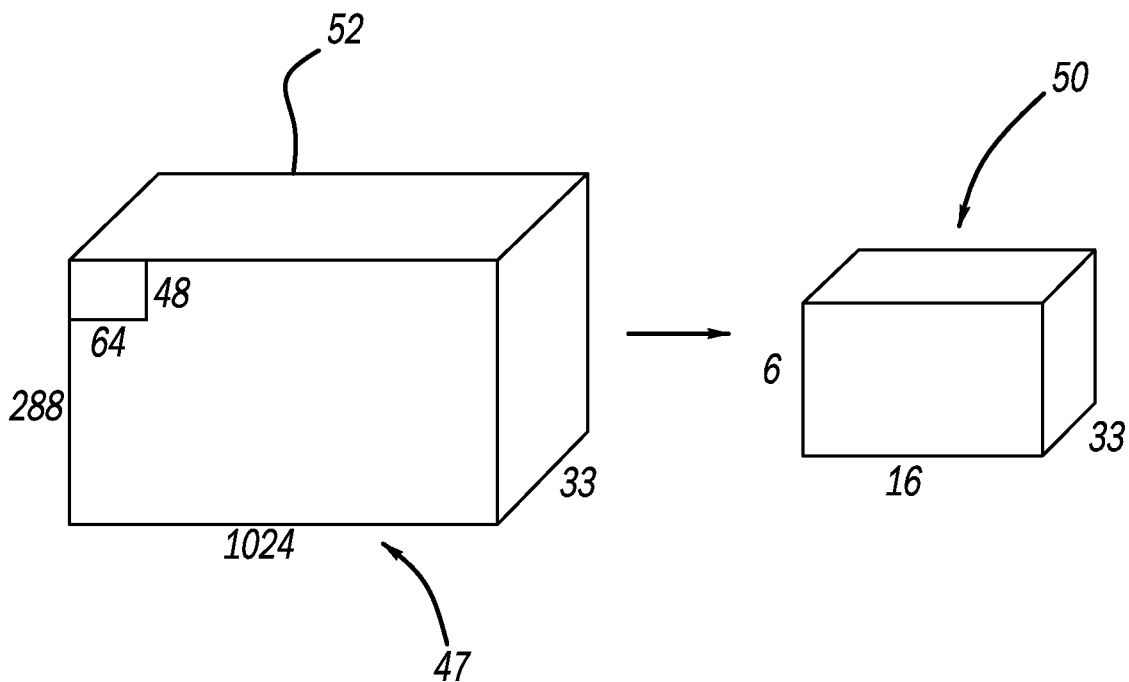
FIG. 3 illustrates the calculation of a shift map from a cost cube in a schematic manner.

The method illustrated in FIG. 3 includes a step of finding the best vertical match for pixels, or regions of pixels, of the rectified left/right images. This step can be performed on a whole rectified image, or, in order to save processing resources, only on one or more smaller parts of a rectified image, for example every nth line of an image, or every nth group of m lines, where n and m are integers larger 1, for example n=2 and m=64. Furthermore, this step can be performed for every pixel of the rectified image or rectified image part(s) considered, or a subset of all pixels, for example every nth pixel, where n is an integer larger 1, for example n=2.

In the step of finding the best vertical match, typically for each pixel 42 in one image 40 a small image part 43 around this pixel is taken and a search is made for the corresponding small image part 44 in a two-dimensional search region 51 in the other image 41 using a cost function, for example the sum of absolute differences or the sum of squared differences.

In the present embodiment, the search is performed by repeating a one-dimensional horizontal search 45, 46, 47 many times, where each horizontal search is shifted vertically around the search 45 by different amounts and both up and down. In FIG. 2, for example two horizontal searches 46 shifted vertically up and two horizontal searches 47 shifted vertically down with respect to the horizontal search 45 are performed, leading to five horizontal searches. It should be understood that the number of horizontal searches 45-47 is preferably higher than five, preferably at least 10, more preferably at least 20, even more preferably at least 30, for example 16+1+16=33.

The preferably equidistant vertical shift of the horizontal searches 45, 46, 47 relative to each other may be a shift by one or more pixels, or preferably a sub-pixel shift, i.e. a shift by fraction of a pixel which is performed by image processing techniques. Vertical sub-pixel shifts provide a higher precision in the determination of the pitch and/or roll angle error than shifts by one or more pixels. The vertical shift is performed on one of the two images 40, 41 by a new rectification or by re-sampling.

Each one-dimensional horizontal 45, 46, 47 search calculates a horizontal match or cost tuple, with one match or cost value for each horizontal position in the one-dimensional horizontal search. The lowest match or cost value in each horizontal match or cost value is then extracted, yielding the vertical matching cost cube containing one match or cost value for each horizontal search performed. More generally, the cost function used in the two-dimensional search yields an individual cost value for each horizontal search performed for each individual pixel 43 considered. Therefore, the number of individual cost values for each pixel considered is equal to the number of horizontal searches performed for that pixel, e.g. 33 in the above mentioned example. The cost values here form the match score; the smaller the cost value, the better the match. Other types of match scores are possible, including match values where the higher the match value, the better the match.

The above mentioned embodiment of executing the effectively two-dimensional search via a plurality of vertically shifted one-dimensional horizontal searches has the advantage that a usual one-dimensional matching engine or hardware for performing the best horizontal match is also used for finding the best vertical match. Therefore, no new or adapted engine or hardware is needed. The horizontal matching engine or hardware can be re-used for finding the best vertical match via time sharing. For example, in alternating time slots A-B-A-B- . . . , horizontal stereo matching (time slots A) and vertically shifted horizontal searches (time slots B) are performed non-simultaneously. As a result, a two-dimensional search is performed using a one-dimensional matching hardware, by running through a stereo matching hardware block several times with different horizontal and vertical shifts on one image.

The set of extracted (vertical) cost values builds up a (vertical) cost cube 52, see FIG. 3. The front of the cost cube 52 in FIG. 3 here has the size of the images 40, 41, while the third dimension is formed by the vertical cost values for the vertical shifts performed. The numbers given in FIG. 3 purely by way of example relate to images with 1024 px×288 px and 33 vertical cost values calculated for each pixel as mentioned above. Therefore, the cost cube 52 is thirty three units deep and includes nearly 10^7 cost values.

By way of example, the image element 44' in FIG. 2 may have the lowest cost value, or the best vertical match, with the image element 43 of the other image. The arrow from the central image element 44 to the image element 44' providing the best vertical match is the vertical shift 45 of the image element 44'. A 1024×288 vertical shift map could be extracted from the large cost cube 52 by identifying, for each pixel in the cost cube, the lowest of the 33 corresponding cost values. However, such a large shift map would be computationally very expensive.

In order to make the invention computationally more affordable, a reduced cost cube 50 shown on the right in FIG. 3 is preferably calculated from the large cost cube 52. This is done by bundling pluralities of image elements or pixels into larger image regions of n×m pixels, where n and m are integers larger one, preferably at least five, more preferably at least ten. The number of image regions considered is preferably at least ten, and/or preferably by a factor of at least ten, more preferably by a factor of at least hundred smaller than the total number of pixels in the image. In a practical embodiment, a full 1024 px×288 px image could be bundled into regions of 64 px×48 px as shown in FIG. 3, leading to 16×6=96 image regions. For each image region a bundled match score tuple (here including 33 vertical shift cost values), or bundled cost tuple, is calculated for example as the sum, or average, of the n×m cost tuples (e.g. 64×48) of the large cost cube 52 belonging to the image region under consideration. This results in a reduced cost cube 50 of much smaller size, having for example 16×6×33=3168 (bundled) cost values.

A large advantage of the smaller cost cube 50 is the strongly reduced amount of data that needs to be buffered. Each horizontal plane in the cost cube, corresponding to one vertical shift, can be calculated at a time. Therefore, instead of having to store 1024×288 cost values for each vertical shift in the case of the large cost cube 52, in this embodiment only 16×6 cost values have to be stored for each vertical shift in the case of the small cost cube 50, which is a reduction by a factor of more than 3000.

From the reduced cost cube 50, a shift map 48 is preferably calculated. For each image element 49 in the reduced cost cube 50, the best match score, or lowest cost value, of the corresponding cost tuple (here out of the 33 corresponding cost values) is determined. This best match score, or lowest cost value, is equivalent to a particular vertical shift which gives the best match between the image region in the left/right images. The vertical shift of each element 49 yields a two-dimensional shift map 48, composed of for example 16×6 image regions 49. Therefore, the shift map 48 is a two-dimensional map where the vertical shift giving the best match is assigned to each element 49 of the shift map 48.

From the shift map 48, the pitch angle error, the roll angle error and other parameters affecting the stereo matching can be calculated in a simple manner. For example, a pitch error can be estimated from a contribution to the shift map pointing in the same direction, here upwards, and having the same size, see FIG. 4. A roll error can be estimated from a contribution to the shift map pointing in opposite directions on the right and on the left, and increasing from the center to the left and to the right, see FIG. 5. A focal length difference or focal length drift between both imaging devices can be calculated from a contribution to the shift map pointing in opposite directions on the top and on the bottom, and increasing from the center to the top and to the bottom, see FIG. 6.

Figure 4:
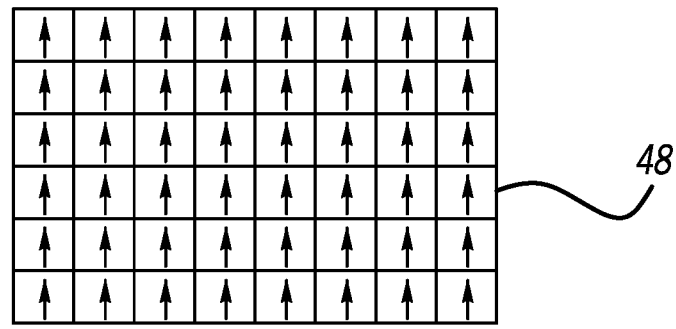
FIGS. 4-6 illustrate calculation of a pitch angle error, a roll angle error and a focal length drift, respectively, from the shift map.
Figure 5:
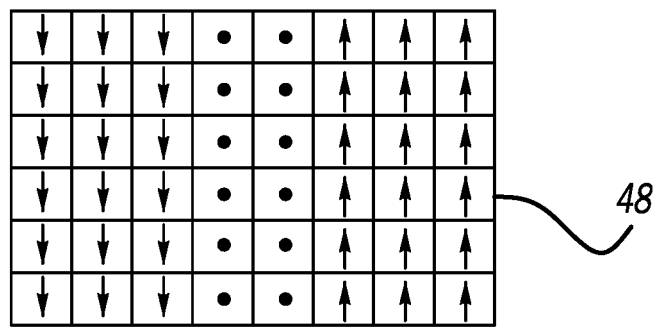
Figure 6:
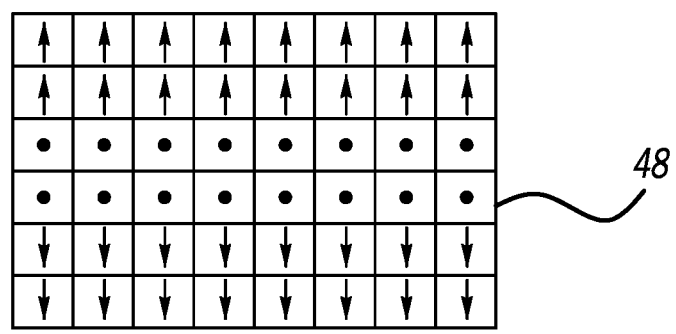

In reality, linear combinations of the pure patterns shown in FIGS. 4 and 5 are likely to arise in the shift map 48. It is possible to extract the contributions from the pitch angle error and the roll angle error from the shift map 48 using suited processing techniques.

Preferably the calculated pitch angle error and/or roll angle error, is fed back into the pre-processing section 13 in order to allow compensation for these errors in the following rectification and/or stereo matching.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle, comprising a pair of imaging devices forming a stereo imaging apparatus and a data processing device adapted to perform a rectification of images captured by the stereo imaging apparatus, a stereo matching of rectified images to produce stereo matched images, and to detect an object in an area surrounding the motor vehicle from the stereo matched images, the data processing device is adapted to perform, for image elements of a rectified image from one of the imaging devices, a search for a best-matching image element in a rectified image from the other of the imaging devices, the search covering a two-dimensional search area, the search yielding vertical shift information from which a vertical shift from an image element to the best-matching image element is derivable, wherein the vertical shift information comprises a plurality of match related scores indicating a degree of match in the vertical shift information from one of the imaging devices between the image element and a plurality of image elements of a corresponding image from the other of the imaging devices shifted with different vertical components relative to the image element from one of the imaging devices, yielding a vertical matching cost cube, the plurality of the image elements from the imaging devices are bundled into larger image regions and for each vertical shift the match related scores from each image element in the image regions are accumulated, yielding a reduced size version of the matching cost cube, wherein the data processing device is adapted to calculate a pitch angle error or a roll angle error of or between the imaging devices from the vertical shift information.

2. The vision system as claimed in claim 1, further comprising in that the vertical shift giving the best match for each of the image regions is determined from the reduced size version of the matching cost cube, yielding a vertical shift map.

3. The vision system as claimed in claim 1, further comprising in that the data processing device is adapted to calculate a focal length difference between both of the imaging devices from the vertical shift information.

4. The vision system as claimed in claim 1, in that the vertical shift information comprises a vector from the image element of one of the imaging devices to the best matching image element in the corresponding rectified image from the other of the imaging devices.

5. The vision system as claimed in claim 4, further comprising in that a vertical shift map is derived from the vertical components of the vectors.

6. The vision system as claimed in claim 2 further comprising in that a pitch error and a roll error are computed from the shift map simultaneously using a minimization function.

7. The vision system as claimed in claim 1, further comprising in that the search is performed using a one-dimensional horizontal search engine and performing a plurality of one-dimensional horizontal searches shifted by different amounts relative to each other in the vertical direction.

8. The vision system as claimed in claim 7, further comprising in that the one-dimensional horizontal search engine is used for performing the stereo matching process and the search non-simultaneously via time sharing.

9. The vision system as claimed in claim 8, further comprising in that the search is performed in idle time slots of, or in alternating time slots with, the stereo matching process.

10. The vision system as claimed in claim 1, further comprising in that the search is performed using a two-dimensional search engine, employing an algorithm capable of performing optical flow calculations.

11. The vision system as claimed in claim 1, further comprising in that the calculated pitch angle error or the roll angle error is used in a later rectification or a stereo matching processes.

12. A vision method for a motor vehicle, using a pair of imaging devices forming a stereo imaging apparatus, the method comprising, rectifying images captured by the stereo imaging apparatus, a stereo matching of rectified images, and detecting an object in an area surrounding the motor vehicle from the stereo matched images, performing for image elements of a rectified image from one of the imaging devices, a search for a best-matching image element in a corresponding rectified image from the other of the imaging devices, the search covering a two-dimensional search area, the search yielding vertical shift information from which a vertical shift from an image element to the best-matching image element is derivable, wherein the vertical shift information comprises a plurality of match related scores indicating a degree of match in the vertical shift information from one of the imaging devices between the image element and a plurality of image elements of a corresponding image from the other of the imaging devices shifted with different vertical components relative to the image element from one of the imaging devices, producing a vertical matching cost cube, bundling the plurality of the image elements from the imaging devices into larger image regions and for each vertical shift, accumulating the match related scores from each image element in the image regions, yielding a reduced size version of the matching cost cube, and calculating a pitch angle error or a roll angle error of or between the imaging devices from the vertical shift information.

* * * * *